United States Patent
Lin et al.

(10) Patent No.: US 6,714,705 B1
(45) Date of Patent: Mar. 30, 2004

(54) TUNABLE CHROMATIC DISPERSION AND DISPERSION SLOPE COMPENSATOR UTILIZING A VIRTUALLY IMAGED PHASED ARRAY AND A ROTATING GRATING

(75) Inventors: Christopher Lin, Richmond, CA (US); Simon X. F. Cao, Fremont, CA (US); Giovanni Barbarossa, Santa Clara, CA (US); Charlene Yang, Palo Alto, CA (US)

(73) Assignee: Avanex Corporation, Fremont, CA (US)

( * ) Notice: Subject to any disclaimer, the term of this patent is extended or adjusted under 35 U.S.C. 154(b) by 124 days.

(21) Appl. No.: 10/140,610

(22) Filed: May 7, 2002

(51) Int. Cl.[7] .................................................. G02B 6/34
(52) U.S. Cl. .............................. 385/37; 385/33; 398/81; 398/87; 359/566
(58) Field of Search ............................... 385/31, 33, 37, 385/123; 398/81, 84, 87; 359/566

(56) References Cited

U.S. PATENT DOCUMENTS 6,556,320 B1 * 4/2003 Cao ............................ 398/65
2003/0147121 A1 * 8/2003 Kawahata et al. ....... 359/337.5

* cited by examiner

*Primary Examiner*—Hemang Sanghavi
(74) *Attorney, Agent, or Firm*—Sawyer Law Group LLP

(57) ABSTRACT

A tunable chromatic dispersion and dispersion slope compensator that utilizes a Virtually Imaged Phased Array (VIPA), a rotating transmissive diffraction grating, and a mirror with different curvatures for different cross-sections is disclosed. The compensator in accordance with the present invention provides simultaneous tunable compensation of chromatic dispersion and dispersion slope utilizing a single apparatus. The amount of compensation is accomplished by rotating the transmissive diffracting grating and/or translating the mirror. A system which utilizes the compensator is thus cost effective to manufacture.

17 Claims, 9 Drawing Sheets

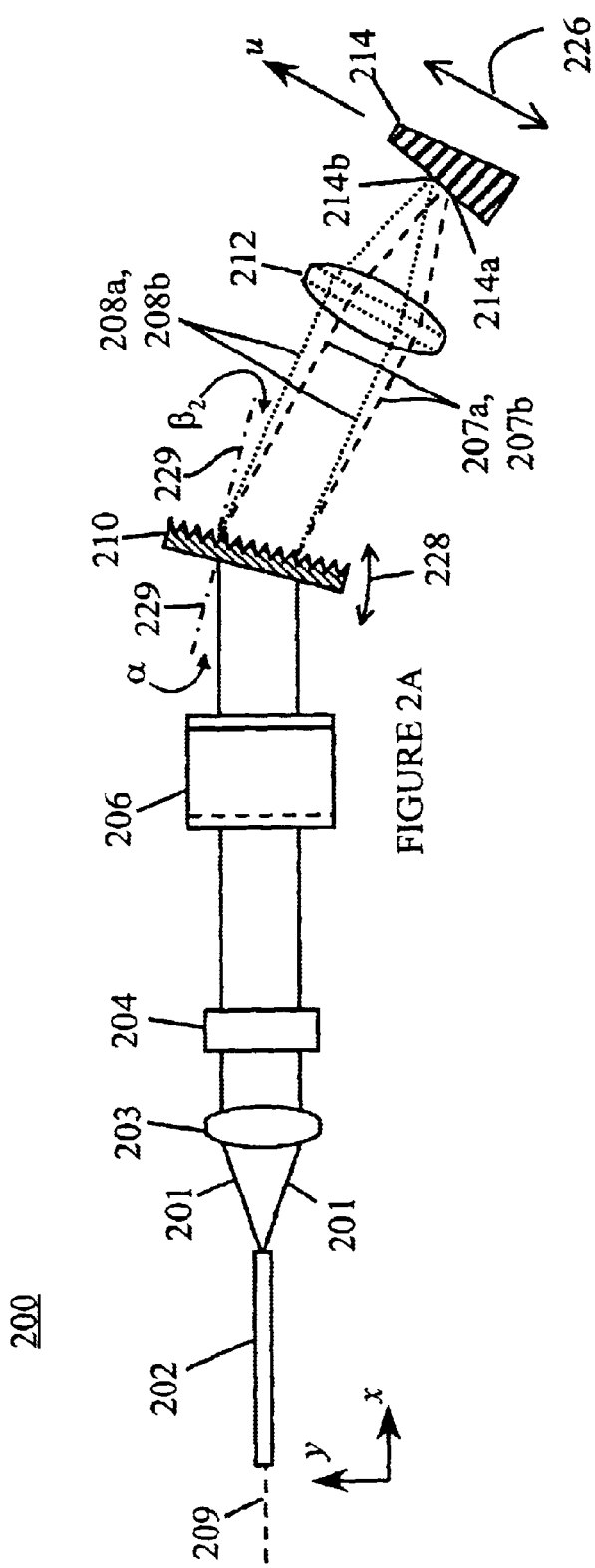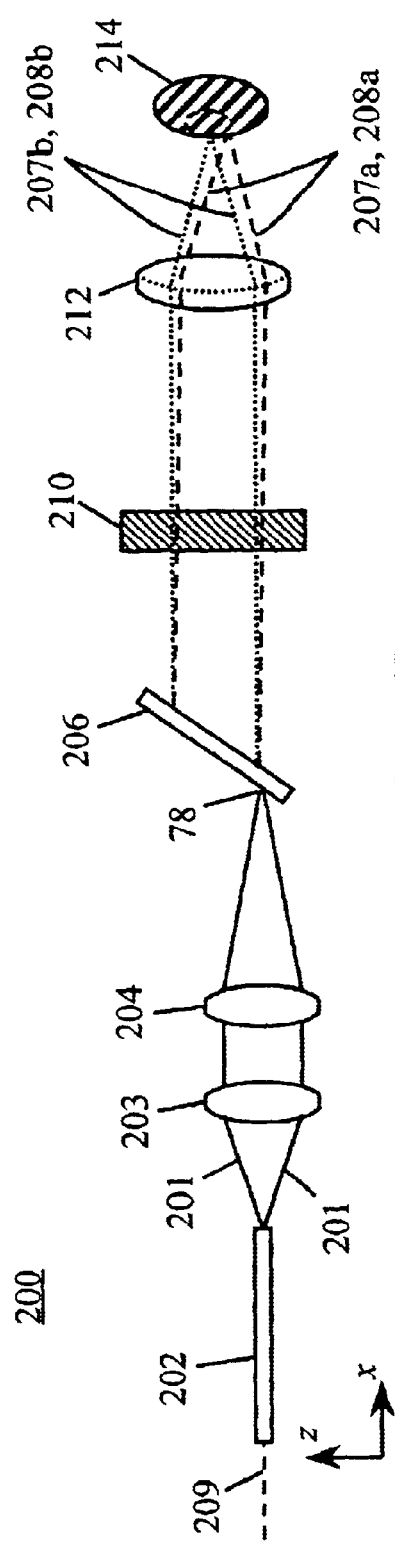

TUNABLE CHROMATIC DISPERSION AND DISPERSION SLOPE COMPENSATOR UTILIZING A VIRTUALLY IMAGED PHASED ARRAY AND A ROTATING GRATING

FIELD OF THE INVENTION

The present invention relates to chromatic dispersion and dispersion slope compensation, and more particularly to chromatic and dispersion slope compensation accumulated in a wavelength division multiplexed optical fiber transmission line.

BACKGROUND OF THE INVENTION

Fiber optic networks are becoming increasingly popular for data transmission because of their high speed and high capacity capabilities. Wavelength division multiplexing (WDM) is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels". The totality of multiple combined signals in a wavelength-division multiplexed optical fiber, optical line or optical system, wherein each signal is of a different wavelength range, is herein referred to as a "composite optical signal".

One common and well-known problem in the transmission of optical signals is chromatic dispersion of the optical signal. Chromatic dispersion refers to the effect wherein the channels comprising an optical signal travel through an optic fiber at different speeds, e.g., longer wavelengths travel faster than shorter wavelengths. This is a particular problem that becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion. The exact value of the chromatic dispersion produced in a channel of a wavelength-division multiplexed fiber optic communications system depends upon several factors, including the type of fiber and the wavelength of the channel. The common approach is to allow chromatic dispersion to accumulate within spans of fiber and to compensate for dispersion at the ends of spans through the use of in-line dispersion compensators.

FIG. 1 is a graph illustrating the chromatic dispersion characteristics of some conventional optical fibers. The graphs in FIG. 1 represent the Group Velocity Dispersion, D, against wavelength for these conventional optical fibers. The quantity D (ps-km$^{-1}$-nm$^{-1}$) is defined by the relationship of the following equation:

$$D = \frac{d}{d\lambda}\left(\frac{1}{v_g}\right) = \frac{1}{L}\left(\frac{d\tau_g}{d\lambda}\right) \quad \text{(Eq. 1)}$$

in which $\lambda$ is the channel wavelength (nm), $v_g$ is the group velocity (km/ps), $\tau_g$ is the group delay time (ps), and L is the fiber length (km). If $v_g$ decreases with increasing wavelength (i.e., longer or "red" wavelengths travel slower than relatively shorter or "blue" wavelengths) then D is positive, otherwise D is negative. Because all three fiber types illustrated in FIG. 1 are deployed in telecommunications systems, the requirements for dispersion compensators vary widely. The chromatic dispersion slope (dispersion slope), S, is given by the first derivatives of the curves shown in FIG. 1. Because dispersion slope is generally not equal to zero, a constant level of dispersion compensation does not accurately negate the dispersion of all channels. This inaccuracy can become a significant problem for high-speed data propagation, long span distances, and/or wide distances between the shortest and longest wavelength channels.

Conventional dispersion compensators include dispersion compensation fiber, chirped fiber Bragg gratings coupled to optical circulators, and conventional diffraction gratings disposed as sequential pairs. A chirped fiber Bragg grating is a special fiber with spatially modulated refractive index that is designed so that longer (shorter) wavelength components are reflected at a farther distance along the chirped fiber Bragg grating than are the shorter (longer) wavelength components. A chirped fiber Bragg grating of this sort is generally coupled to a fiber communications system through an optical circulator. By causing certain wavelength components to travel longer distances than other wavelength components, a controlled delay is added to those components and opposite dispersion can be added to a pulse. However, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system.

A conventional diffraction grating has the property of outputting different wavelengths at different angles. By using a pair of gratings in a coupled spatial arrangement, this property can be used to compensate chromatic dispersion in a fiber communications system. In such a spatial grating pair arrangement, lights of different wavelengths are diffracted from a first grating at different angles. These lights are then input to a second grating that diffracts them a second time so as to set their pathways parallel to one another. Because the different lights travel with different angles between the two gratings, certain wavelength components are made to travel longer distances than other wavelength components. Chromatic dispersion is produced in the spatial grating pair arrangement because the wavelength components that travel the longer distances incur time delays relative to those that travel the shorter distances. This grating-produced chromatic dispersion can be made to be opposite to that of the fiber communications system, thereby compensating the chromatic dispersion within the system. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, the two gratings of a spatial grating pair would have to be separated by a very large distance, thereby making such a spatial grating pair arrangement impractical.

Accordingly, there exists a need for an improved tunable chromatic dispersion compensator and dispersion slope compensator which provides simple control of or adjustment of the degree of chromatic dispersion and dispersion slope compensation in a single integrated apparatus. The present invention addresses such a need.

SUMMARY OF THE INVENTION

The present invention provides a method and apparatus for tunable chromatic dispersion and dispersion slope compensation for a composite optical signal in an optical fiber transmission system. The composite optical signal includes a plurality of channels, each of the plurality of channels includes a band of wavelengths, where the bands of wavelengths have unwanted dispersion and dispersion slope. An apparatus in accordance with the present invention comprises a collimator optically coupled to an optical signal input and output device, a line focusing lens optically coupled to the collimator at a side opposite to the signal input and output, a Virtually Imaged Phased Array (VIPA) optically coupled to the line focusing lens at a side opposite to the collimator, a transmission diffraction grating with rotational capability optically coupled to the VIPA at a side opposite to the collimator, a lens optically coupled to the transmission diffraction grating at a side opposite to the VIPA and a three-dimensionally curved mirror with translational capabilities optically coupled to the lens at a side opposite to the transmission diffraction grating. A compensator in accordance with the present invention provides simultaneous tunable compensation of dispersion and dispersion slope through rotation of the transmission diffraction grating and/or translation of the three-dimensionally curved mirror.

BRIEF DESCRIPTION OF THE FIGURES

FIGS. 2A and 2B illustrate a top view and a side view, respectively, of a preferred embodiment of a tunable chromatic dispersion and dispersion slope compensator in accordance with the present invention.

DETAILED DESCRIPTION

Figure 1:
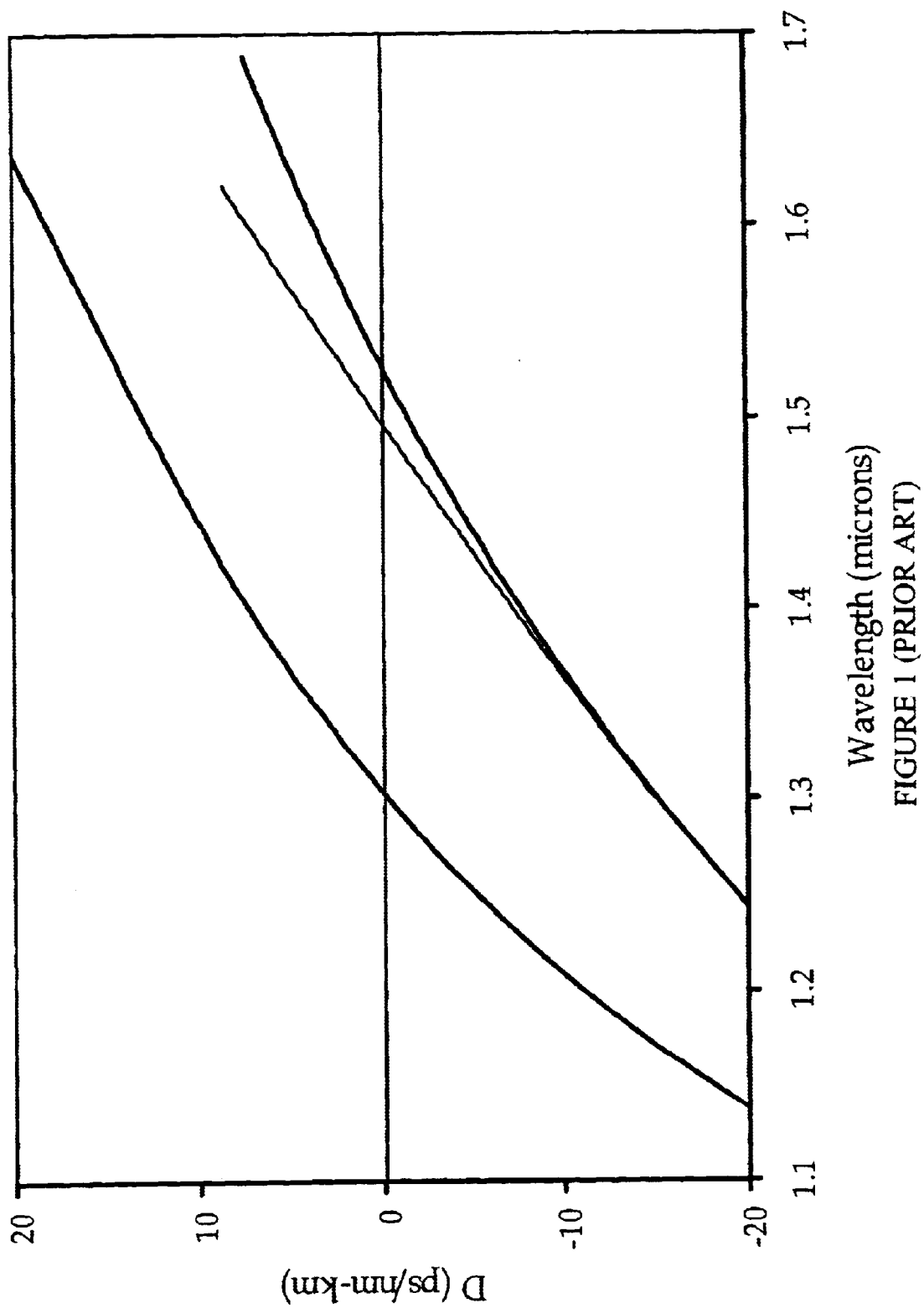
FIG. 1 is a graph illustrating the chromatic dispersion characteristics of some conventional optical fibers.

The present invention provides an improved tunable chromatic dispersion compensator and dispersion slope compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2A through 7B in conjunction with the discussion below.

FIGS. 2A–2B illustrate a top view and side view, respectively, of a preferred embodiment of a tunable chromatic dispersion and dispersion slope compensator in accordance with the present invention. Accordingly, FIG. 2A is a projection of the apparatus onto the x-y plane and FIG. 2B is a projection of the apparatus onto the x-z plane. The compensator 200 comprises a plurality of optically coupled components, comprising an optical fiber 202, a collimator 203, a line-focusing lens 204, a Virtually Imaged Phased Array (VIPA) 206, a transmission diffraction grating 210, a lens 212, and a three-dimensionally curved mirror 214. The optical fiber 202 inputs a composite optical signal to the apparatus 200 and outputs a dispersion compensated and dispersion slope compensated composite optical signal from the apparatus 200. Preferably, the line-focusing lens 204 comprises, at least in part, a cylindrical or semi-cylindrical lens. Preferably, the collimator 203 comprises at least one lens. Any of the lenses may comprise a compound lens or lens assembly. Two mechanical adjustments are possible within the compensator 200—a translation adjustment 226 of the three-dimensional curved mirror 214 and a rotational adjustment 228 of the transmission diffraction grating 210.

Within the compensator 200, a wavelength-division multiplexed composite signal 201 is output from fiber 202, is collimated by collimator 203 and is then brought to a line focus 78 on or within the VIPA 206 by the line-focusing lens 204. As described in greater detail in the following discussion, the VIPA 206 spatially disperses the wavelengths comprising each one of the channels of composite signal 201, such that rays of each wavelength emanate from the opposite side of the VIPA 206 along ray paths which are parallel to one another but of a different direction than rays of any other wavelength comprising each respective channel. In the example shown in FIGS. 2A–2B, the VIPA 206 disperses the wavelengths—that is, separates the wavelengths from one another—along a vertical dispersion plane.

Within FIG. 2B, ray paths of a relatively longer wavelength 207a and ray paths of a relatively shorter wavelength 207b of a first channel are illustrated by dashed and dotted lines, respectively. Further, the ray paths of a relatively longer wavelength 208a and ray paths of a relatively shorter wavelength 208b of a second channel are similarly illustrated. The difference between the path of the relatively longer wavelength 207a and the relatively shorter wavelength 207b of the first channel or between the relatively longer wavelength 208a and the relatively shorter wavelength 208b of the second channel results from the dispersion of the VIPA 206 along a vertical plane. As explained in greater detail in the following discussion, the thickness of VIPA 206 satisfies the soiled "WDM-matching FSR thickness" condition. Therefore, immediately upon output from VIPA 206, the paths of the relatively longer wavelength 207a of the first channel overlap the ray paths of the relatively longer wavelength 208a of the second channel. Likewise, the paths of the relatively shorter wavelength 207b of the first channel overlap the ray paths of the relatively shorter wavelength 208b of the second channel.

After being output from VIPA 206, the separated wavelengths are passed through the transmission diffraction grating 210. Upon passing through the transmission diffraction grating 210, the paths of the various signals are spatially dispersed from one another according to their respective wavelengths. The dispersion plane of transmission grating 210 is perpendicular to that of the VIPA 206. Thus, as shown in FIG. 2A, the dispersion plane of transmission diffraction grating 210 is horizontal and, upon emerging from this grating, the wavelengths comprising the first channel are output with different horizontal vector components from those of the second channel. Therefore, the path of the relatively longer wavelength 207a of the first channel is separated from that of the relatively longer wavelength 208a of the second channel in the Top View. Similarly, the relatively shorter wavelengths 207b, 208b of the channels are separated from one another.

The spatially dispersed wavelengths 207a–207b of the first channel of composite optical signal 201 and the spatially separated wavelengths 208a–208b of the second channel of composite optical signal 201 are focused by lens 212 onto the surface of the three-dimensionally curved mirror 214. Because of the spatial dispersion within a horizontal plane by the transmission diffraction grating 210, each channel intercepts the mirror 214 at a different position, wherein the different positions are horizontally separated. The mirror 214 (FIG. 2C) may comprise any one of a number of complex shapes. In general, the curvature of the mirror differs between the positions at which the wavelengths of the different channels are reflected. As described in more detail later in this discussion, the curvature of the mirror 214 at a given position determines the amount of chromatic dispersion provided to the respective channel reflected from that position.

As is evident from the above discussion, the diffraction from the transmission grating 210 determines the position at which a channel will intercept the mirror 214. The composite optical signal 201 is incident upon the transmission diffraction grating 210 at an angle of incidence α, wherein, according to common convention, the angle α is measured between the pathway of the composite optical signal 201 and the normal line 229 to the surface of the transmission diffraction grating 210. The various channels each diffract from the transmission diffraction grating 210 at a unique diffraction angle, $\beta_1$, $\beta_2$, etc. Only one such angle, $\beta_2$, measured between the grating normal line 229 and the pathway of the diffracted second channel, is shown. As the grating 210 is rotated along its adjustment direction 228, the angle α changes. Further, the angle β changes according to the first-order diffraction condition, given by $$\sin \alpha = \sin \beta + \lambda/\Lambda \quad \text{(Eq. 2)}$$

wherein λ is the light wavelength and Λ is the pitch of the grating 210, which is the spacing between the "grooves" or other diffraction-producing periodic modulation within the grating 210.

Because of the diffraction by grating 210, the light rays 207a–207b, comprising the first channel, intercept the mirror 214 at position 214a and those light rays 208a–208b comprising the second channel intercept the mirror 214 at position 214b. As the grating 210 is rotated about its adjustment direction 228, both the angle α and the angle β change. However, by Eq. 2, the angle β does not change by the same amount or at the same rate as the angle α. As a result, the positions 214a–214b at which the channels reflect from the mirror 214 are caused to move across the surface of the mirror 214. Simultaneously, the mirror 214 may be translated along its adjustment direction 226 so as to either partially counteract or enhance to movements of the positions 214a–214b relative to the mirror surface.

The mirror 214 reflects the light rays of each wavelength such that all such rays are directed back through lens 212, are recollimated by lens 212 and are directed back through the transmission grating 210, the VIPA 206, the line-focusing lens 204 and the collimator 203 in this order. These reflected rays are not shown in FIGS. 2A–2B. In side view (FIG. 2B), the curvature of mirror 214 at each cross-section may be similar to either a flat mirror, a convex mirror or a concave mirror such that the relatively longer wavelengths 207a, 208a comprising each channel are reflected along different directions from the relatively shorter wavelengths 207b, 208b of each channel. In particular, the difference between the vertical directional component of the relatively longer wavelength and of the relatively shorter wavelength of each channel is such that the wavelengths are returned to different virtual images of the beam waist of the line focus 78 of VIPA 206 as described in more detail in the following discussion.

Because of the 3-dimensional curvature of mirror 214, each channel intercepts the mirror 214 at a position with a different respective curvature in vertical cross section. In the example shown in Top View in FIG. 2A, for instance, the position 214b of mirror 214 comprises a greater degree of curvature (i.e., a smaller radius of curvature) than does the position 214a, although the mirror 214 can be configured oppositely to this example. Because the amount of mirror curvature determines the magnitude and the sign of chromatic dispersion provided to a channel by the apparatus 200 and because the curvature differs amongst the various different positions 214a, 214b, etc., the apparatus 200 can compensate for chromatic dispersion slope—that is, the changes in acquired chromatic dispersion between channels—as well as simply for chromatic dispersion. Further, since the grating 210 may be rotated so as to cause the positions 214a, 214b, etc. to migrate along the mirror 214, the magnitude of the provided chromatic dispersion slope may itself be varied.

In the top view (FIG. 2A), the reflected light of each wavelength that returns to the transmission grating 210 comprises an angle of incidence, i.e., $\beta_1$, $\beta_2$, ..., that is substantially equal to the diffraction angle of the light of the same wavelength upon passing through the grating the first time in the forward direction. Because of this situation, in the top view (FIG. 2A), the returning light of each and every wavelength is set substantially parallel to the axial dimension 209 of fiber 202 after passing through transmission grating 210 for the second time.

In the side view (FIG. 2B), the relatively longer and relatively shorter (and other) wavelengths comprising each channel are returned to respective different virtual images of the beam waist of focal line 78 so as to comprise different optical path lengths through VIPA 206 and thereby acquire compensatory chromatic dispersion. These light paths through the VIPA 206 are described in greater detail in the following discussion. Since the light of the various channels are reflected from positions along mirror 214 with possibly different curvatures, the degree of compensatory chromatic dispersion can vary in a systematic fashion from channel to channel. The light of all wavelengths of all channels then propagates in the reverse direction through the VIPA 206 so as to be output from the focal line 78. The light is then collimated by line-focusing lens 204 and refocused into the end face of fiber 202 by the collimator 203.

Figure 2C:
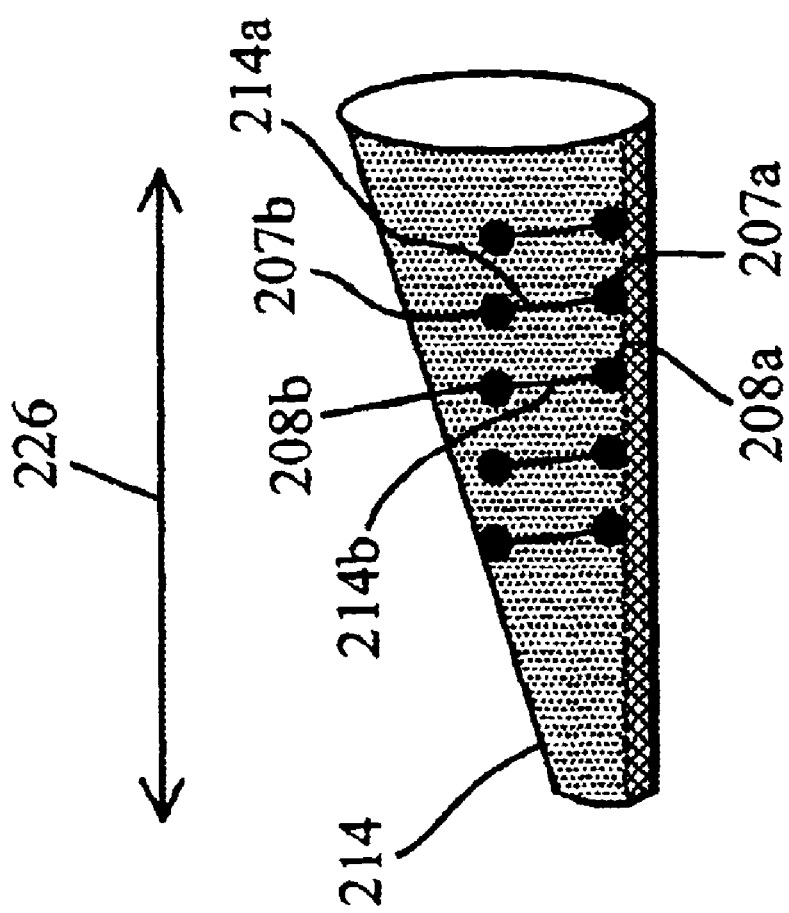
FIG. 2C illustrates the wavelengths of the channels of the composite optical signal as focused onto a mirror within the preferred embodiment of the compensator in accordance with the present invention.

FIG. 2C illustrates the wavelengths of the channels of the composite optical signal as focused onto the three-dimensional curved mirror 214 of the preferred embodiment of the compensator in accordance with the present invention. The relatively longer wavelength 207a is separated from the relatively shorter wavelength 207b of the first channel in the vertical dimension by virtue of the spatial dispersion of wavelengths by the VIPA 206. Likewise, the relatively longer wavelength 208a is separated from the relatively shorter wavelength 208b of the second channel in the vertical dimension. The remainder of the intermediate wavelengths comprising the first channel and the second channel lie along the curves joining the focal points of wavelengths 207a and 207b and joining the focal points of wavelengths 208a and 208b, respectively. These curves comprise the positions 214a, 214b, etc. The wavelengths comprising the first channel are separated from those comprising the second channel along a horizontal direction by virtue of the spatial dispersion of wavelengths by the grating 210. Similarly, the wavelengths comprising a plurality of additional channels comprising composite optical signal 201 are focused along essentially parallel curves disposed to one side and/or the other side of the focal positions of the first and the second channels.

As illustrated in FIG. 2C, the channels are focused at positions along the 3-dimensional mirror 214 having different radii of curvature in vertical cross sections. The exact positions at which the channels focus upon the mirror 214 are controlled or "tuned" by the disposition of the grating 210 along its rotational adjustment 228 and, possibly, also by the disposition of the mirror 214 along its translational adjustment 226. Consequently, the degree of mirror curvature at the focal positions and the difference in mirror curvature between the focal positions of the channels are also controlled by these adjustment dispositions. The mirror 214 then reflects the wavelengths comprising each and every channel so as to return, in the reverse direction, through all the optical components, i.e., the lens 212, the grating 210, the VIPA 206, the line-focusing lens 204 and the collimator 203, in this order. After passing through the collimator 203 in the return direction, the channels are focused into the end of fiber 202 so as to be output from the compensator 200.

Figure 3:
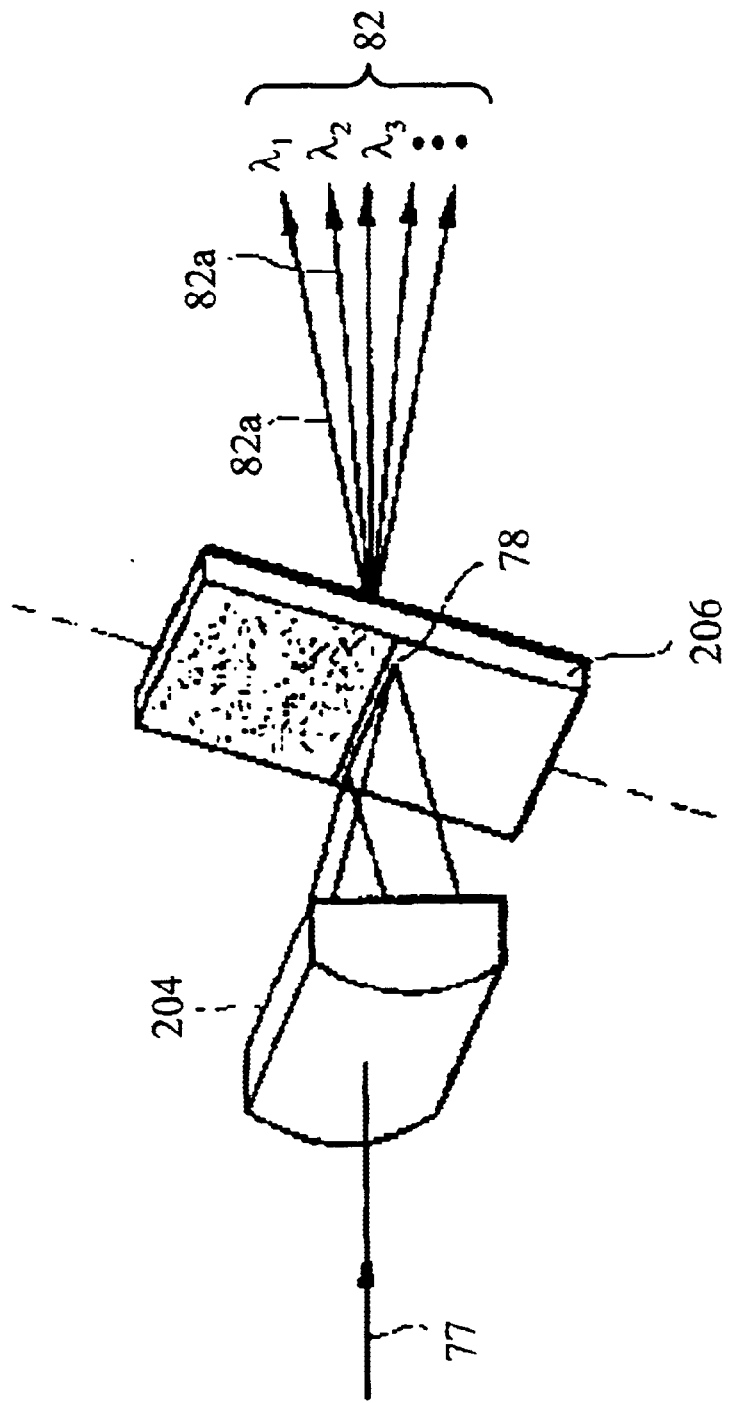
FIG. 3 illustrates a Virtually Imaged Phased Array (VIPA) of the preferred embodiment of the chromatic dispersion and dispersion slope compensator in accordance with the present invention.

The understanding of the operation of the VIPA 206 is central to the understanding of the functioning of the compensator 200 and the role of mirror curvature in determining the magnitude and sign of the provided chromatic dispersion. Therefore, FIGS. 3–7B provide additional details of the construction and operation of the VIPA 206. The VIPA apparatus is also disclosed in U.S. Pat. No. 5,930,045, incorporated herein by reference. FIG. 3 illustrates the VIPA 206, which is preferably made of a thin plate of glass. An input light 77 is focused into a line 78 with a line focusing lens 204, such as a cylindrical or semi-cylindrical lens, so that input light 77 travels into VIPA 206. Line 78 is herein referred to as the "focal line". Input light 77 radially propagates from focal line 78 to be received inside VIPA 206. The VIPA 206 then outputs a luminous flux 82 of collimated light, where the output angle of luminous flux 82 varies as the wavelength of input light 77 changes. For example, when input light 77 is at a wavelength $\lambda_1$, VIPA 206 outputs a luminous flux 82a at wavelength $\lambda_1$ in a specific direction. When input light 77 is at a wavelength $\lambda_2$, VIPA 206 outputs a luminous flux 82b at wavelength $\lambda_2$ in a different direction. Therefore, VIPA 206 produces luminous fluxes 82a and 82b that are spatially distinguishable from each other.

Figure 4:
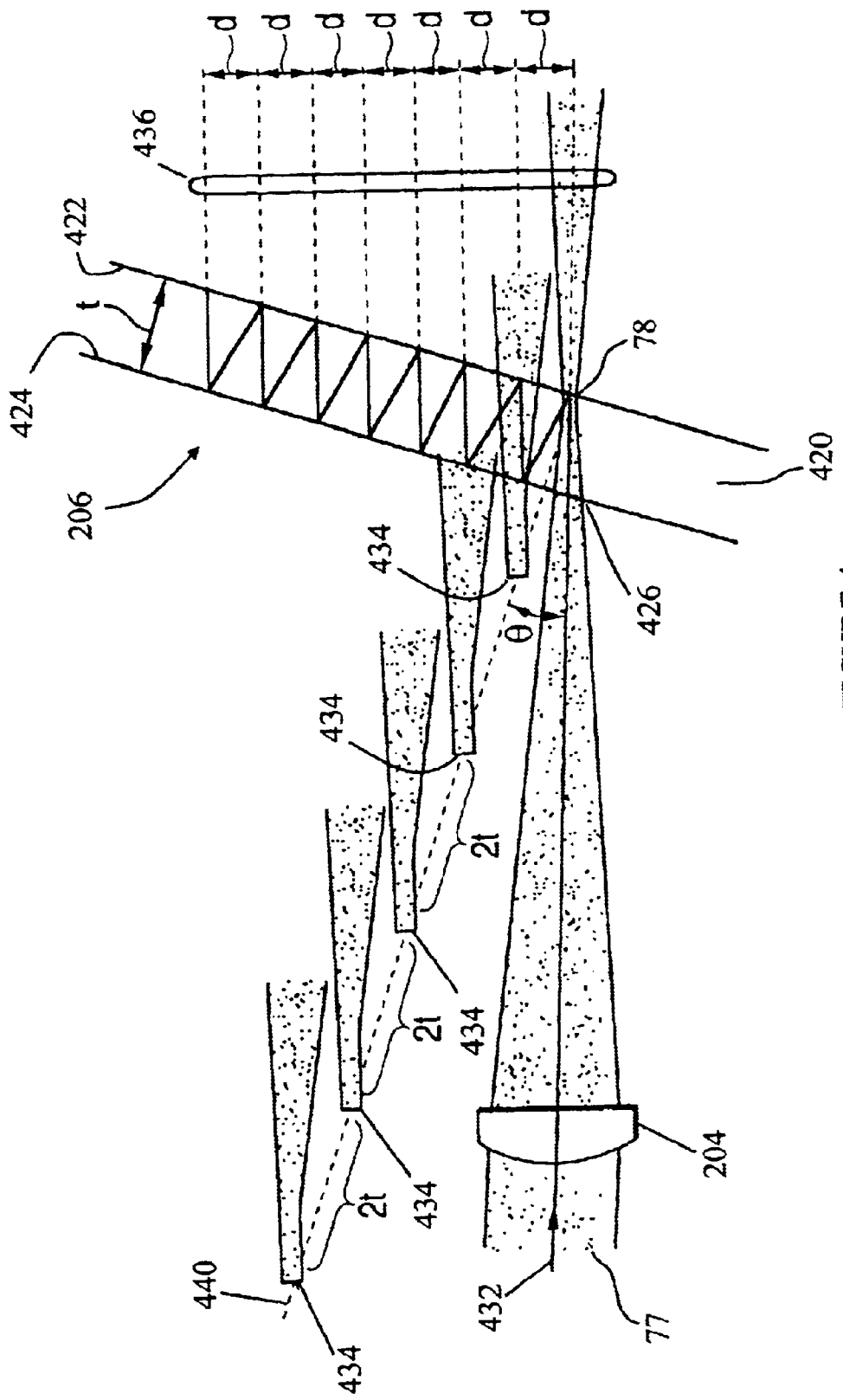
FIG. 4 illustrates in more detail the light path through and operation of the VIPA of FIG. 3.

FIG. 4 illustrates in more detail the VIPA 206 and light paths therein and therethrough. The VIPA 206 includes a plate 420 made of, for example, glass, and having reflecting films 422 and 424 thereon. Reflecting film 422 preferably has a reflectance of approximately 95% or higher, but less than 100%. Reflecting film 424 preferably has a reflectance of approximately 100%. A radiation window 426 is formed on plate 420 and preferably has a reflectance of approximately 0% reflectance.

Input light 77 is focused into focal line 78 by line-focusing lens 204 through radiation window 426, to subsequently undergo multiple reflection between reflecting films 422 and 424. Focal line 78 is preferably on the surface of plate 420 to which reflecting film 422 is applied. Thus, focal line 78 is essentially line focused onto reflecting film 422 through radiation window 426. The width of focal line 78 can be referred to as the "beam waist" of input light 77 as focused by line-focusing lens 204. Thus, the VIPA 206 focuses the beam waist of input light 77 onto the far surface (that is, the surface having reflecting film 422 thereon) of plate 420. By focusing the beam waist on the far surface of plate 420, the VIPA 206 reduces the possibility of overlap between (i) the area of radiation window 426 on the surface of plate 420 covered by input light 77 as it travels through radiation window 426 and (ii) the area on reflecting film 424 covered by input light 77 when input light 77 is reflected for the first time by reflecting film 424. It is desirable to reduce such overlap to ensure proper operation of the VIPA 206.

In FIG. 4, an optical axis 432 of input light 77 has a small tilt angle $\theta$ with respect to a line 440 perpendicular to the plane of plate 420. Upon the first reflection off of reflecting film 422, 5% of the light passes through reflecting film 422 and diverges after the beam waist, and 95% of the light is reflected towards reflecting film 424. After being reflected by reflecting film 424 for the first time, the light again hits reflecting film 422 but is displaced by an amount d. Then, 5% of the light passes through reflecting film 422. In a similar manner, the light is split into many paths with a constant separation d. The beam shape in each path forms so that the light diverges from virtual images 434 of the beam waist. Virtual images 434 are located with constant spacing 2t along a line 440 that is normal to plate 420, where t is the thickness of plate 420. The positions of the beam waists in virtual images 434 are self-aligned, and there is no need to adjust individual positions. The lights diverging from virtual images 434 interfere with one another and form collimated light 436 which propagates in a direction that changes in accordance with the wavelength of input light 77.

The spacing of light paths is $d=2t \sin \theta$, and the difference in the path lengths between adjacent beams is $2t \cos \theta$. The angular dispersion of the VIPA 206 is proportional to the ratio of these two numbers, which is $\cot \theta$. As a result, a VIPA 206 produces a significantly large angular dispersion.

Reflecting surfaces 422 and 424 are in parallel with each other and spaced by the thickness t of plate 420 and are typically reflecting films deposited on plate 420. As previously described, reflecting surface 424 has a reflectance of approximately 100%, except in radiation window 426, and reflecting surface 422 has a reflectance of approximately 95% or higher. Therefore, reflecting surface 422 has a transmittance of approximately 5% or less so that approximately 5% or less of light incident on reflecting surface 422 will be transmitted therethrough and approximately 95% or more of the light will be reflected. The reflectances of reflecting surfaces 422 and 424 can easily be changed in accordance with the specific VIPA application. However, generally, reflecting surface 422 should have a reflectance which is less than 100% so that a portion of incident light can be transmitted therethrough. This reflectance need not be constant along the reflecting film 422.

The reflecting surface 424 has radiation window 426 thereon. Radiation window 426 allows light to pass therethrough, and preferably has no reflectance, or a very low reflectance. Radiation window 426 receives input light 77 to allow input light 77 to be received between, and reflected between, reflecting surfaces 422 and 424.

A VIPA 206 has strengthening conditions which are characteristics of the design of the VIPA 206. The strengthening conditions increase the interference of the output lights so that a luminous flux is formed. The strengthening conditions of the VIPA are represented by the following equation:

$$2t \cos \Phi = m\lambda \quad \text{(Eq. 3)}$$

in which $\Phi$ indicates the propagation direction of the resulting luminous flux as measured from a line perpendicular to the surface of reflecting surfaces 422 and 424, $\lambda$ indicates the wavelength of the input light, t indicates the distance between the reflecting surfaces 422 and 424, and m indicates an integer. Therefore, if t is constant and m is assigned a specific value, then the propagation direction $\Phi$ of the luminous flux formed for input light having wavelength $\lambda$ can be determined.

More specifically, input light 77 is radially dispersed from focal line 78 through a specific angle. Therefore, input light having the same wavelength will be traveling in many different directions from focal line 78, to be reflected between reflecting surfaces 422 and 424. The strengthening conditions of the VIPA 206 cause light traveling in a specific direction to be strengthened through interference of the output lights to form a luminous flux having a direction corresponding to the wavelength of the input light. Light traveling in a different direction than the specific direction required by the strengthening condition is weakened by the interference of the output lights.

Figure 5:
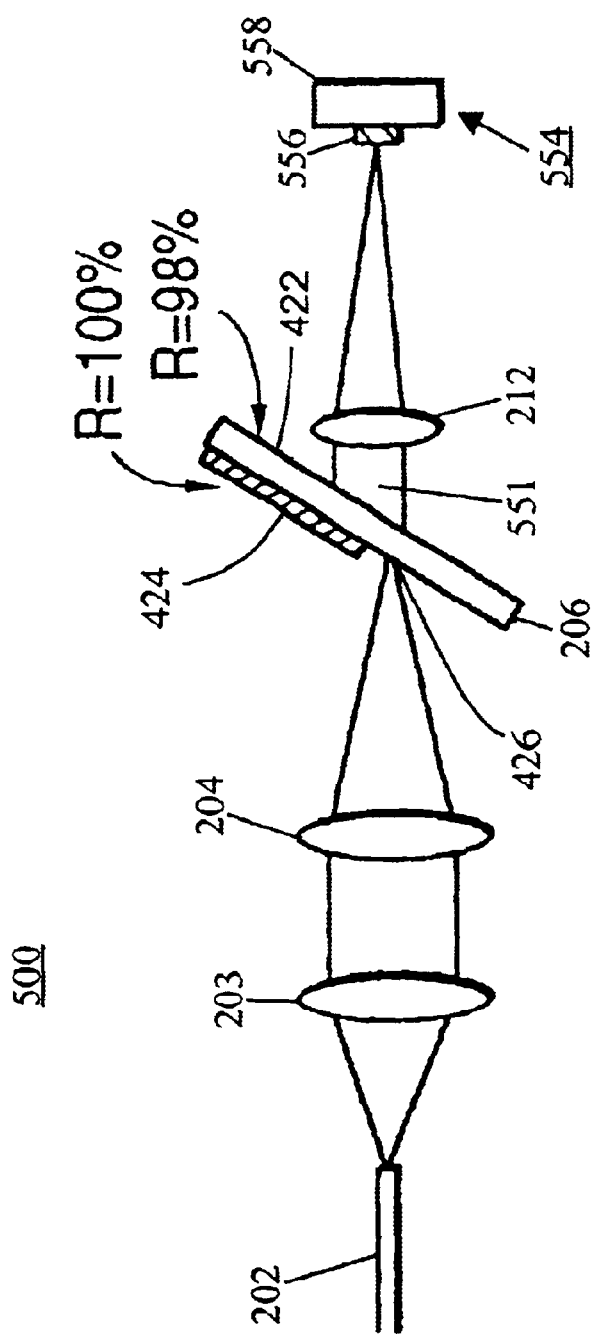
FIG. 5 illustrates an example prior-art apparatus which uses a VIPA and a light returning device to produce chromatic dispersion.

FIG. 5 illustrates an example prior-art apparatus 500 that uses a VIPA as an angular dispersive component to provide chromatic dispersion. The prior-art apparatus 500 does not compensate for chromatic dispersion slope. As illustrated in FIG. 5, a light is output from a fiber 202, collimated by a collimator 203 and line-focused into VIPA 206 through radiation window 426 by a line-focusing lens 204. The VIPA 206 then produces a collimated light 551 which is focused by a focusing lens 212 onto a flat mirror 554. Mirror 554 can be a mirror portion 556 formed on a substrate 558. Mirror 554 reflects the light back through focusing lens 212 into VIPA 206. The light then undergoes multiple reflections in VIPA 206 and is output from radiation window 426. The light output from radiation window 426 travels through line-focusing lens 204 and collimator 203 and is received by fiber 202.

Therefore, light is output from VIPA 206 and reflected by mirror 554 back into VIPA 206. The light reflected by mirror 554 travels through the path which is substantially opposite in direction to the path through which it originally traveled. Different wavelength components in the light are focused onto different positions on minor 554, and are reflected back to VIPA 206. As a result, different wavelength components travel different distances, to thereby produce chromatic dispersion.

Figure 6:
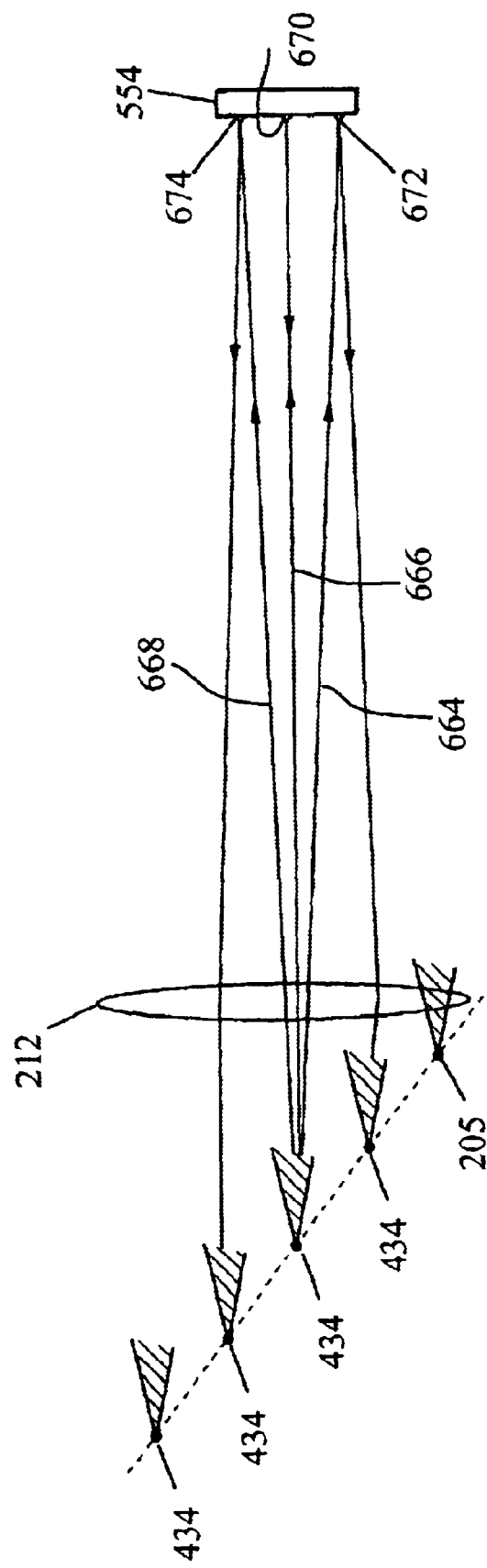
FIG. 6 illustrates in more detail the example apparatus illustrated in FIG. 5.

FIG. 6 illustrates in more detail the light paths through the example prior-art apparatus illustrated in FIG. 5. Assume a light having various wavelength components is received by VIPA 206. The VIPA 206 will cause the formation of virtual images 434 of beam waist 205, where each virtual image 434 "emits" light. Focusing lens 212 focuses the different wavelength components in a collimated light from VIPA 206 at different points on mirror 554. More specifically, a longer wavelength 664 focuses at point 672, a center wavelength 666 focuses at point 670, and a shorter wavelength 668 focuses at point 674. Then, longer wavelength 664 returns to a virtual image 434 that is closer to beam waist 205, as compared to center wavelength 666. Shorter wavelength 668 returns to a virtual image 434 that is farther from beam waist 205, as compared to center wavelength 666. Thus, the different wavelengths travel different distances and chromatic dispersion is thereby provided to the light.

Mirror 554 is designed to reflect only light in a specific interference order, and light in any other interference order should be focused out of mirror 554. More specifically, as previously described, a VIPA 206 will output a collimated light. This collimated light will travel in a direction such that the optical path length difference between subsequent virtual images contributing to the collimated light is $m\lambda$, where m is an integer. The $m^{th}$ order of interference is defined as an output light corresponding to m. Each order comprises a plurality of wavelength components and the wavelength components of one order are repeated in any other order. However, collimated lights at the same wavelength for different interference orders generally travel in different directions and are therefore focused at different positions. Thus, the mirror 554 can be made to reflect only light from a single interference order back into VIPA 206.

A wavelength division multiplexed light usually includes many channels, wherein each channel has a center wavelength and the center wavelengths are usually spaced apart by a constant frequency spacing. If the thickness t between first and second reflecting surfaces 422 and 424 of VIPA 206 is set at a specific value, the arrangement will be able to simultaneously compensate for dispersion in each channel. The thickness t which permits such simultaneous dispersion compensation is such that all of the wavelength components corresponding to the center wavelengths of the respective channels have the same output angle from VIPA 206 and thus the same focusing position on mirror 554. This is possible when the thickness t is set so that, for each channel, the round-trip optical length through VIPA 206 traveled by the wavelength component corresponding to the center wavelength is a multiple of the center wavelength of each channel, that is, t is such that the quantity $2nt/\cos \theta$ is an integer multiple of the center wavelength of each channel, where n is the refractive index of the material comprising the plate 420. This amount of thickness t is referred to herein as the "WDM matching FSR thickness".

Therefore, in FIGS. 5 and 6, with the thickness t set to the WDM matching FSR thickness, VIPA 206 and focusing lens 212 will cause (a) the wavelength component corresponding to the center wavelength of each channel to be focused at point 670 on mirror 554, (b) the wavelength component corresponding to the longer wavelength component of each channel to be focused at point 672 on mirror 554, and (c) the wavelength component corresponding to the shorter wavelength component of each channel to be focused at point 674 on mirror 554. Therefore, VIPA 206 can be used to compensate for chromatic dispersion in all channels of a wavelength division multiplexed light. However, this prior-art VIPA-based dispersion-compensating apparatus does not compensate for dispersion slope.

Figure 7A:
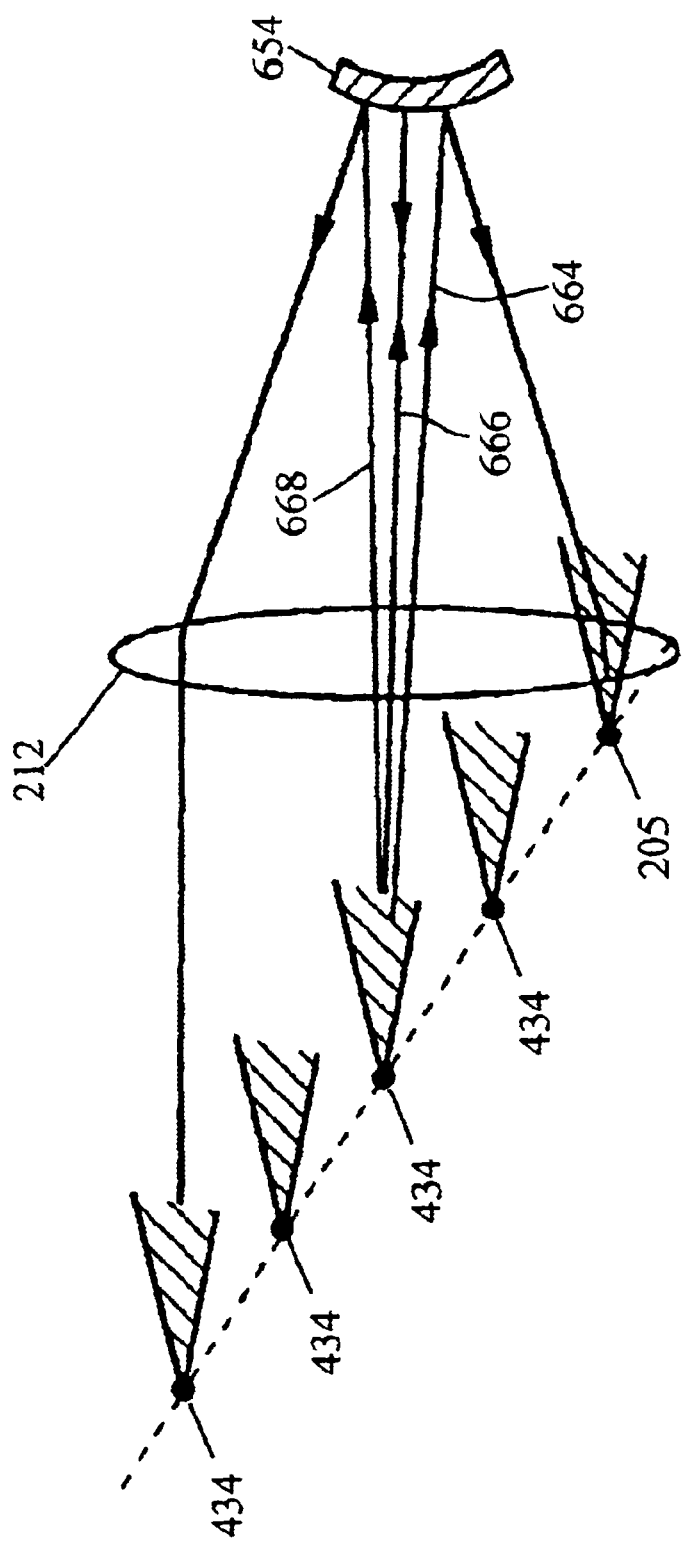
FIGS. 7A and 7B illustrates additional example prior-art apparatuses which uses a VIPA to provide chromatic dispersion to light.
Figure 7B:
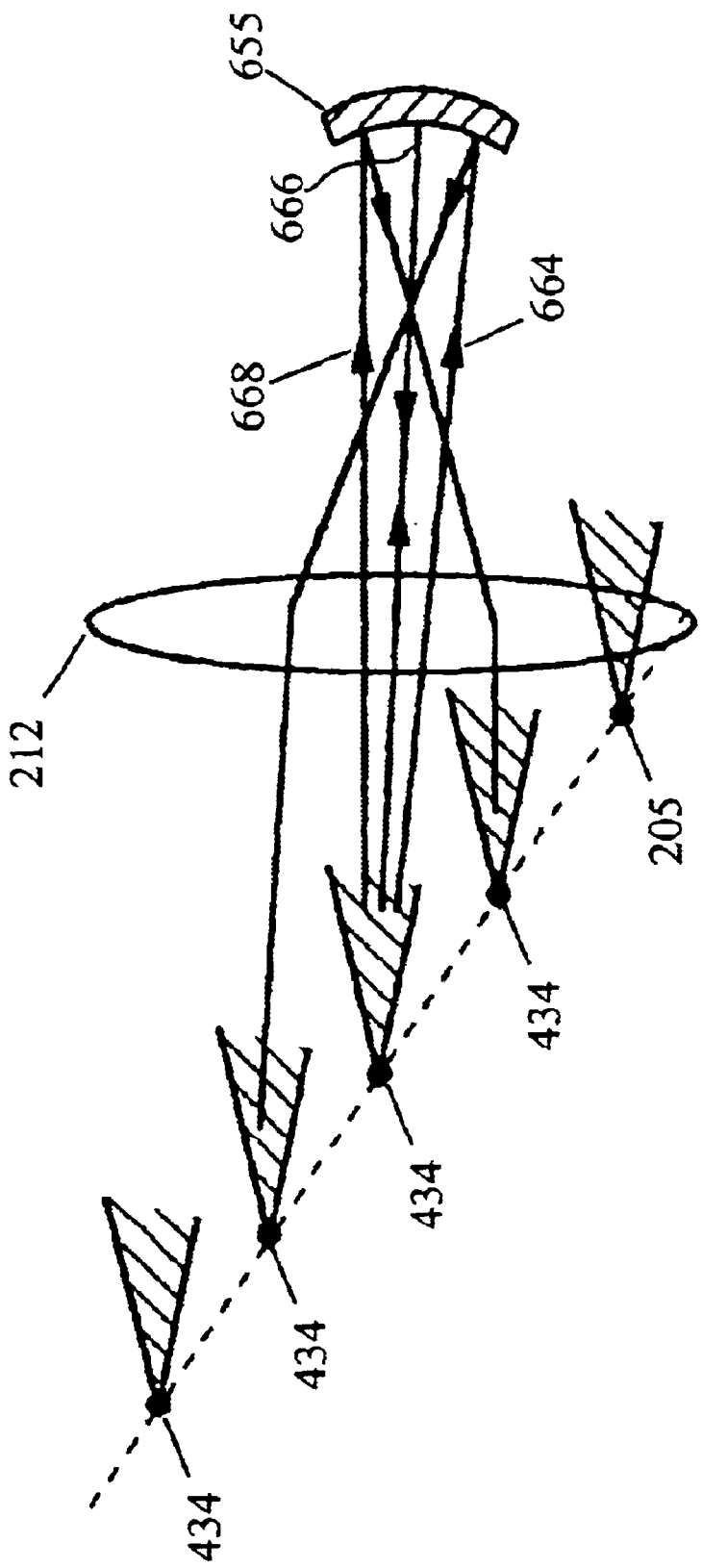

FIGS. 7A and 7B illustrate additional examples that show how different mirror curvatures change the magnitude of chromatic dispersion provided by a VIPA-containing chromatic dispersion compensator. In FIGS. 7A and 7B, there are illustrated the travel directions of a longer wavelength 664, a center wavelength 666 and a shorter wavelength 668 of light emitted by a virtual image 434 of beam waist 205. The mirror 654 (FIG. 7A) and the mirror 655 (FIG. 7B) are located at or near the focal point of focusing lens 212. In FIG. 7A, mirror 654 is a convex mirror. With a convex mirror, the beam shift is magnified relative to that produced by a flat mirror (FIG. 6). Therefore, a large chromatic dispersion can be obtained with a short lens focal length and a small amount of space. In FIG. 7B, mirror 655 is a concave mirror. With a concave mirror, the sign of the dispersion is inverted relative to that produced by a flat mirror.

With either a flat mirror 554 (FIG. 6) or a convex mirror 654 (FIG. 7A), the light of longer ("red") wavelengths of an optical signal travels a shorter round trip distance through the apparatus then does the light of shorter ("blue") wavelengths of the signal. Thus, negative chromatic dispersion is introduced into the signal. This form of apparatus is useful for compensating accumulated positive chromatic dispersion in an optical signal. With a concave mirror 655 (FIG. 7B), the light of "red" wavelengths of an optical signal travels a greater distance through the apparatus then does the light of "blue" wavelengths of the signal and, thus, positive chromatic dispersion is introduced into the signal. This latter form of apparatus is useful for compensating accumulated negative chromatic dispersion in an optical signal.

Returning once again to the discussion of the apparatus 200 (FIGS. 2A–2B), the curvature of the mirror 214 may vary in a complex fashion along a direction approximately parallel to the adjustment direction 226. From the above discussion, it may be understood that, since the channels reflect from the mirror 214 at different positions comprising different curvatures, different values of chromatic dispersion, D, are provided to the various channels. Let the u-axis be parallel to the adjustment direction 226 within the x-y plane and let dD/du be the rate of change in the provided chromatic dispersion with change in reflection position along the u-axis. The dispersion slope, $D_s$, that is provided by the apparatus 200 at a particular angle of incidence α is the product of the angular dispersion $(\partial\beta/\partial\lambda)_\alpha$ of the diffraction grating 210, the focal length, f, of the focusing lens 212 and the rate of change of dispersion, dD/du, along the u-axis as given by Eq. 4:

$$D_s = f\left(\frac{\partial\beta}{\partial\lambda}\right)_\alpha \frac{dD}{du} \quad \text{(Eq. 4)}$$

As the grating 210 rotates, the angle of incidence, α, changes and the dispersion slope, $D_s$, varies as $$\frac{dD_s}{d\alpha} = f\frac{dD}{du}\frac{\partial^2\beta}{\partial\alpha\partial\lambda} = f\frac{dD}{du}\left(\frac{\sin\beta\cos\alpha}{\Lambda\cos^3\beta}\right) \quad \text{(Eq. 5)}$$

Eq. 5 above provides the basis for tuning the dispersion slope. It should be noted, however, that the dispersion bias, $D_c$, (defined as the dispersion at the center channel, $\lambda_c$, of a plurality of channels) will generally change as the diffraction grating 210 is rotated through its rotational adjustment 228 and the dispersion slope is tuned. This shift in dispersion bias, $\Delta D_c$, is given by $$\Delta D_c = f\left(\frac{\partial\beta}{\partial\alpha}\right)_{\lambda_c}\frac{dD}{du}\Delta\alpha = f\frac{dD}{du}\left(\frac{\cos\alpha}{\cos\beta}\right) \quad \text{(Eq. 6)}$$

wherein Δα is the change in incidence angle as a result of the rotation. This shift in dispersion bias can be offset, if needed, by translating the three-dimensionally curved mirror 214 along its adjustment direction 226 in tandem with the rotation of the transmission diffraction grating 210 about its rotational adjustment 228.

Although the present invention has been described above as comprising a transmission grating, one of ordinary skill in the art will understand that a rotatable non-transmissive diffraction grating may alternatively be employed without departing from the spirit and scope of the present invention.

A tunable chromatic dispersion and dispersion slope compensator that utilizes a Virtually Imaged Phased Array (VIPA) and a rotating diffraction grating has been disclosed. The compensator in accordance with the present invention provides simultaneous tunable compensation of chromatic dispersion and dispersion slope utilizing a single apparatus. A system which utilizes the compensator is thus cost effective to manufacture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dispersion and dispersion slope compensator, comprising:

a Virtually Imaged Phased Array (VIPA) optically coupled to an optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise dispersion and dispersion slope;

a rotatable transmissive diffraction grating, wherein a first side of the rotatable transmissive diffraction grating is optically coupled to a second side of the VIPA;

a focusing lens, wherein a first side of the focusing lens is optically coupled to a second side of the rotatable transmissive diffraction grating; and a mirror optically coupled to a second side of the focusing lens, wherein the mirror is translationally adjustable, wherein the mirror comprises a different curvature at different cross-sections, wherein the mirror reflects the bands of wavelengths from different cross-sections toward a return direction, wherein the bands of wavelengths propagate through the focusing lens, the rotatable transmissive diffraction grating, and the VIPA in the return direction, wherein compensatory dispersion and compensatory dispersion slope are added to the reflected bands of wavelengths such that the dispersion and dispersion slope are compensated.

2. The compensator of claim 1, wherein the VIPA separates the wavelengths in a band of wavelengths in each of a plurality of channels, wherein each of the wavelengths in the band is spatially distinguishable from the other wavelengths in the band.

3. The compensator of claim 1, wherein the rotatable transmissive diffraction grating spatially separates each band of wavelengths in the plurality of channels traversing through the transmissive diffraction grating in the forward direction.

4. The compensator of claim 1, further comprising:

a line-focusing lens optically coupled to the first side of the VIPA; and a collimator optically coupled to the line-focusing lens at a side opposite to the VIPA.

5. A dispersion and dispersion slope compensator, comprising:
- a collimator optically coupled to an optical fiber transmission system at a first side of the collimator;
- a line-focusing lens optically coupled to a second side of the collimator;
- a VIPA optically coupled to a second side of the line-focusing lens, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise dispersion and dispersion slope, wherein the VIPA separates the wavelengths in a band of wavelengths in each of a plurality of channels, wherein each of the wavelengths in the band is spatially distinguishable from the other wavelengths in the band;
- a rotatable transmissive diffraction grating, wherein a first side of the rotatable transmissive diffraction grating is optically coupled to a second side of the VIPA, wherein the rotatable transmissive diffraction grating spatially separates each band of wavelengths in the plurality of channels traversing through the rotatable transmissive diffraction grating in the forward direction;
- a focusing lens, wherein a first side of the focusing lens is optically coupled to a second side of the rotatable transmissive diffraction grating; and
- a mirror optically coupled to a second side of the focusing lens, wherein the mirror is translationally adjustable, wherein the mirror comprises a different curvature at different cross-sections, wherein the mirror reflects the spatially separated bands of wavelengths from different cross-sections toward a return direction,
- wherein the bands of wavelengths propagate through the focusing lens, the transmissive diffraction grating, and the VIPA in the return direction,
- wherein compensatory dispersion and compensatory dispersion slope are added to the reflected bands of wavelengths such that the dispersion and dispersion slope are compensated.

6. A method for dispersion compensation for a composite optical signal in an optical fiber transmission system, the composite optical signal comprising a plurality of channels, each of the plurality of channels comprising a band of wavelengths, wherein the bands of wavelengths comprises dispersion and dispersion slope, comprising the steps of:
- (a) propagating the composite optical signal in a forward direction;
- (b) separating the wavelengths in the band of wavelengths in each of the plurality of channels utilizing a VIPA, wherein the each of the wavelengths in the band is spatially distinguishable from the other wavelengths in the band;
- (c) spatially separating each band of wavelengths in the plurality of channels utilizing a rotatable transmission diffraction grating; and
- (d) reflecting the spatially separated bands of wavelengths from different cross-sections of a mirror toward a return direction, wherein the mirror is translationally adjustable, wherein the mirror comprises different curvatures at the different cross-sections, wherein compensatory dispersion and compensatory dispersion slope are added to the reflected bands of wavelengths such that the dispersion and dispersion slope are compensated.

7. A system, comprising:
- an optical fiber transmission system; and
- a dispersion and dispersion slope compensator, comprising:
  - a VIPA optically coupled to the optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise dispersion and dispersion slope,
  - a rotatable transmissive diffraction grating, wherein a first side of the rotatable transmissive diffraction grating is optically coupled to a second side of the VIPA,
  - a focusing lens, wherein a first side of the focusing lens is optically coupled to a second side of the rotatable transmissive diffraction grating, and
  - a mirror optically coupled to a second side of the focusing lens, wherein the mirror is translationally adjustable, wherein the mirror comprises a different curvature at different cross-sections, wherein the mirror reflects the bands of wavelengths from different cross-sections toward a return direction,
  - wherein the bands of wavelengths propagate through the focusing lens, the rotatable transmissive diffraction grating, and the VIPA in the return direction,
  - wherein compensatory dispersion and compensatory dispersion slope are added to the reflected bands of wavelengths such that the dispersion and dispersion slope are compensated.

8. The system of claim 7, wherein the VIPA separates the wavelengths in a band of wavelengths in each of a plurality of channels, wherein each of the wavelengths in the band is spatially distinguishable from the other wavelengths in the band.

9. The system of claim 7, wherein the rotatable transmissive diffraction grating spatially separates each band of wavelengths in the plurality of channels traversing through the transmissive diffraction grating in the forward direction.

10. The system of claim 7, further comprising:
- a line-focusing lens optically coupled to the first side of the VIPA; and
- a collimator optically coupled to the line-focusing lens at a side opposite to the VIPA.

11. A system, comprising:
- an optical transmission system; and
- a dispersion and dispersion slope compensator, comprising:
  - a collimator optically coupled to the optical fiber transmission system at a first side of the collimator,
  - a line-focusing lens optically coupled to a second side of the collimator,
  - a VIPA optically coupled to a second side of the line-focusing lens, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise dispersion and dispersion slope, wherein the VIPA separates the wavelengths in a band of wavelengths in each of a plurality of channels, wherein each of the wavelengths in the band is spatially distinguishable from the other wavelengths in the band,
  - a rotatable transmissive diffraction grating, wherein a first side of the rotatable transmissive diffraction grating is optically coupled to a second side of the VIPA, wherein the rotatable transmissive diffraction grating spatially separates each band of wavelengths in the plurality of channels traversing through the transmissive diffraction grating in the forward direction, a focusing lens, wherein a first side of the focusing lens is optically coupled to a second side of the rotatable transmissive diffraction grating, and a mirror optically coupled to a second side of the focusing lens, wherein the mirror is translationally adjustable, wherein the mirror comprises a different curvature at different cross-sections, wherein the mirror reflects the spatially separated bands of wavelengths from different cross-sections toward a return direction, wherein the bands of wavelengths propagate through the focusing lens, the transmissive diffraction grating, and the VIPA in the return direction, wherein compensatory dispersion and compensatory dispersion slope are added to the reflected bands of wavelengths such that the dispersion and dispersion slope are compensated.

12. A system, comprising:

means for propagating a composite optical signal in a forward direction, the composite optical signal comprising dispersion and dispersion slope;

means for separating wavelengths in a band of wavelengths in each of a plurality of channels utilizing a VIPA, wherein each of the wavelengths in the band is spatially distinguishable from the other wavelengths in the band;

means for spatially separating each band of wavelengths in the plurality of channels utilizing a rotatable transmission diffraction grating; and means for reflecting the spatially separated bands of wavelengths from different cross-sections of a mirror toward a return direction, wherein the mirror is translationally adjustable, wherein the mirror comprises different curvatures at the different cross-sections, wherein compensatory dispersion and compensatory dispersion slope are added to the reflected bands of wavelengths such that the dispersion and dispersion slope are compensated.

13. A dispersion and dispersion slope compensator, comprising:

a VIPA optically coupled to an optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise dispersion and dispersion slope;

a diffraction grating optically coupled to a second side of the VIPA and disposed such that a light propagating from the VIPA to the diffraction grating comprises an adjustable angle of incidence;

a focusing lens, wherein a first side of the focusing lens is optically coupled to the diffraction grating; and a mirror optically coupled to a second side of the focusing lens, wherein the mirror reflects each band of wavelengths from different positions on the mirror toward a return direction, wherein the reflected bands of wavelengths propagate through the focusing lens, diffract from the diffraction grating, and propagate through the VIPA in the return direction, wherein compensatory dispersion and compensatory dispersion slope are added to the reflected bands of wavelengths such that the dispersion and dispersion slope are compensated, wherein a magnitude of the added compensatory dispersion and compensatory dispersion slope depends upon the angle of incidence.

14. The compensator of claim 13, wherein the mirror comprises an adjustable position, wherein the magnitude of added compensatory dispersion and compensatory dispersion slope depends upon the adjustable position.

15. A system comprising:

means for propagating a composite optical signal comprising dispersion and dispersion slope in a forward direction;

means for separating wavelengths in a band of wavelengths in each of a plurality of channels utilizing a VIPA, wherein each of the wavelengths in the band is spatially distinguishable from the other wavelengths in the band;

means for spatially separating each band of wavelengths in the plurality of channels utilizing a diffraction grating, the diffraction grating comprising an adjustable angle of incidence; and means for reflecting the spatially separated bands of wavelengths from different cross-sections of a mirror toward a return direction, wherein the mirror comprises different curvatures at the different cross-sections, wherein compensatory dispersion and compensatory dispersion slope are added to the reflected bands of wavelengths such that the dispersion and dispersion slope are compensated, wherein a magnitude of the added compensatory dispersion and compensatory dispersion slope depends upon the adjustable angle of incidence.

16. The system of claim 15, wherein the mirror comprises an adjustable position, wherein the magnitude of the added compensatory dispersion and compensatory dispersion slope depends upon the adjustable position.

17. A method for dispersion compensation for a composite optical signal in an optical fiber transmission system, the composite optical signal comprising a plurality of channels, each of the plurality of channels comprising a band of wavelengths, wherein the bands of wavelength comprises dispersion and dispersion slope, comprising the steps of:

(a) propagating the composite optical signal in a forward direction;

(b) separating the wavelengths in the band of wavelengths in each of the plurality of channels utilizing a VIPA, wherein each of the wavelengths in the band is spatially distinguishable from the other wavelengths in the band;

(c) spatially separating each band of wavelengths in the plurality of channels utilizing a diffraction grating, the diffraction grating comprising an adjustable angle of incidence; and (d) reflecting the spatially separated bands of wavelengths from different cross-sections of a mirror toward a return direction, wherein the mirror comprises different curvatures at the different cross-sections, wherein compensatory dispersion and compensatory dispersion slope are added to the reflected spatially separated bands of wavelengths such that the dispersion and dispersion slope are compensated, wherein a magnitude of the added compensatory dispersion and compensatory dispersion slope depends upon the adjustable angle of incidence.

* * * * *